July 22, 1969  S. J. LEVENSON  3,456,489
SHOCK ABSORBER TESTER

Filed Jan. 16, 1968  2 Sheets-Sheet 1

INVENTOR
SOL J. LEVENSON
BY Bosworth Sessions
Herrstrom + Cain
ATTORNEYS

INVENTOR
SOL J. LEVENSON
BY Bosworth Sessions
Herrstrom & Cain
ATTORNEYS

United States Patent Office 3,456,489
Patented July 22, 1969

3,456,489
SHOCK ABSORBER TESTER
Sol J. Levenson, University Heights, Ohio
(2636 S. Belvoir Blvd., Cleveland, Ohio. 44118)
Filed Jan. 16, 1968, Ser. No. 698,220
Int. Cl. G01n 17/04
U.S. Cl. 73—11                    3 Claims

ABSTRACT OF THE DISCLOSURE

A portable testing device for measuring and indicating the dampening ability of shock absorbers while mounted on the sprung end of an automobile. The device includes a fluid operated lever which lifts a sprung end of the automobile a predetermined amount and then releases it to jounce, rebound and oscillate naturally thereafter. An accelerometer measures the magnitude of the oscillations as well as their duration and thus indicates the dampening ability of the shock absorbers.

Background of the invention

This invention relates to the in situ testing of shock absorbers on automobiles and especially to an improved portable testing device which indicates to an operator whether or not the dampening ability of the shock absorbers on a sprung end of an automobile is within acceptable limits. More particularly the invention relates to a compact, portable, shock absorber testing unit which is fluid operated using a fluid pressure source normally available in service stations and garages.

A particular problem in the in situ testing of shock absorbers on automobiles is that of providing a device which can be readily adapted to automobiles of different construction and weight and still afford a uniformly reliable indication. For example, assuming a sprung end of the automobile is to be lifted and released from a front or rear bumper, it is necessary that the lifting member of the device be first initially positioned in engagement with a bumper which may be located at varying heights above the floor depending upon the type of automobile. Then the sprung end must be lifted a predetermined amount regardless of the weight and spring design in order to simulate a representative service operating condition that causes a jounce-rebound cycle and thus loads the shock absorbers.

Prior art devices such as those shown in U.S. Patent No. 3,164,003 to MacMillan, have typically used a triggering type mechanism wherein the lifting member is mechanically released by a trip device for example after the sprung end of a vehicle is raised to the desired position. The sprung end is then permitted to drop naturally and go through its jounce-rebound cycle and subsequent oscillations. Such devices, however, lack the adaptability desired in order to obtain uniform results on different types of vehicles and also are awkward and cumbersome to operate.

The device of the present invention substantially reduces the problems indicated above and affords other features and advantages not obtainable from the prior art.

Summary of the invention

It is among the objects of the invention to test with improved accuracy and facility, shock absorbers associated with an automobile suspension system while the shock absorbers are mounted on a sprung end of an automobile.

Another object is to adapt a portable testing unit for in situ testing of automobile shock absorbers, to use in association with fluid pressure equipment normally available at service stations and garages.

A further object is to improve the reliability, efficiency and safety of in situ testing of automobile shock absorbers with equipment of relatively compact, low-cost construction which is uniformly adaptable to the weight and construction of many different types of automobiles.

These and other objects are accomplished by a portable shock absorber testing unit preferably mounted on retractable rollers or casters, comprising a base frame and a lifting arm pivotally supported thereon with one end operable to engage and lift a sprung end of the automobile on which shock absorbers to be tested are mounted. The arm is operated by a fluid cylinder supported on the base frame. A position indicator is provided on the lever to enable an operator to visually determine the height to which the sprung end of the automobile is raised by the arm after first engagement between the arm and the automobile. One fluid supply means is provided for extending the piston rod from the cylinder to raise the end of the arm and another fluid supply means is provided for lowering the end of the lever at an acceleration greater than that of the sprung end of the automobile during the jounce of the sprung end from its raised position. Finally, means is provided for measuring and indicating the magnitude of the accelerations as well as the duration of the vertical oscillations induced by the dropping of the sprung end from its raised position, to determine the dampening ability of the shock absorbers.

Other objects, uses and advantages of the invention will be apparent from the following detailed description and drawings.

Description of the preferred embodiment

Figure 1:
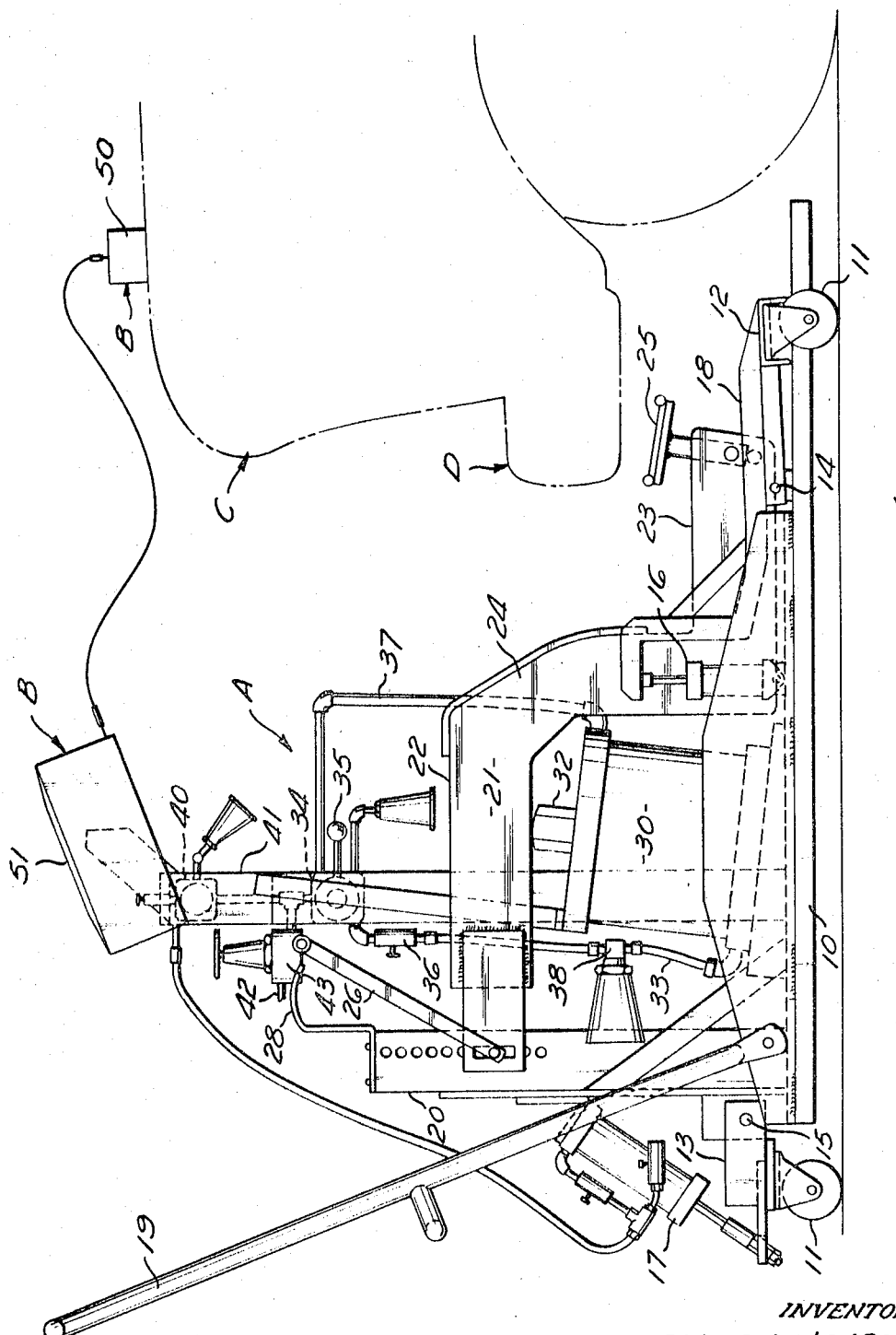
FIGURE 1 is a side elevational view of a shock absorber testing unit embodying the invention.
Figure 2:
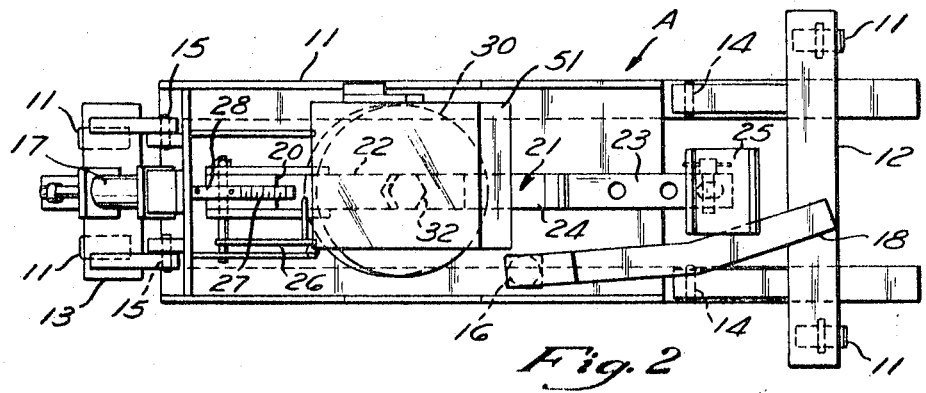
FIGURE 2 is a plan view on a smaller scale, of the shock absorber testing unit of FIGURE 1.

Referring more particularly to the drawings there is shown a portable shock absorber testing unit A embodying the invention with a meter B mounted thereon for measuring and indicating the dampening ability of shock absorbers mounted in association with the suspension system at one end of an automobile C shown in dashed lines. The testing unit A is adapted to apply a representative service load to the shock absorbers by lifting the sprung end of the automobile C through engagement with the bumper D and then release the bumper D so that the sprung end of the vehicle jounces downward to a position below the neutral position shown in FIGURE 1, and then rebounds and oscillates until the shock absorbers dampen the motion and the automobile returns to its neutral position.

The portable testing unit A comprises a welded base frame 10 supported on four casters 11. Two of the casters 11 are mounted on a front caster frame 12, and two on a rear caster frame 13, the front caster frame 12 and rear caster frame 13 each being pivotally connected to the base frame 10 by pivot pins 14 and 15 respectively.

The casters 11 while normally located in their extended position shown in FIGURE 1, are retracted when the testing unit A is positioned for operation so that the welded base frame 10 rests on the floor. The retraction of the casters is accomplished by means of front and rear air cylinders 16 and 17 respectively pivotally connected to the base frame 10. The front air cylinder 16 has a downwardly extending piston rod operatively connected to the rearward end of a lever 18 welded to the front caster frame 12, whereby the retraction movement of the piston in the front air cylinder 16 is effective to retract the front caster frame casters 11 with respect to the base frame 10. The rear air cylinder 17 has a downwardly extending piston operatively connected to the rearward end of the rear caster frame 13 so that the retraction movement of the piston in the cylinder 17 serves to retract the rear caster frame casters 11 relative to the base frame 10, the cylinders 16 and 17 being connected for simultaneous operation.

The operator may roll the unit A on the extended casters 11 using an operating handle 19 pivotally connected to the base frame 10 (FIGURE 1).

Pivotally connected to a vertical post 20 welded to the base frame 10 is a dog-leg shaped lifting arm 21 having an upper end 22 connected to the post 20, a lower end 23 adapted to be positioned beneath the bumper D at the sprung end of the automobile C to be lifted for testing, and a central connecting portion 24 generally perpendicular to the ends 22 and 23. A bumper shoe 25 is mounted at the lower end 23 of the arm 21 for engaging the automobile bumper D. The position of the bumper shoe 25 is adjustable in order to assure that it can be positioned at a proper height for the many different types of vehicles upon which testing is to be accomplished.

Located on the upper end 22 of the operating arm 21 is a position indicator arm 26 which is adjustably connected at the pivot connection to the vertical post 20. The outer end of the arm 26 provides a reading on a position scale 27 marked on a sheet metal strip 28 bolted to the top of the vertical post 20 in order to provide the operator with a visual indication of the height to which the sprung end of an automobile is lifted relative to its neutral position.

Figure 3:
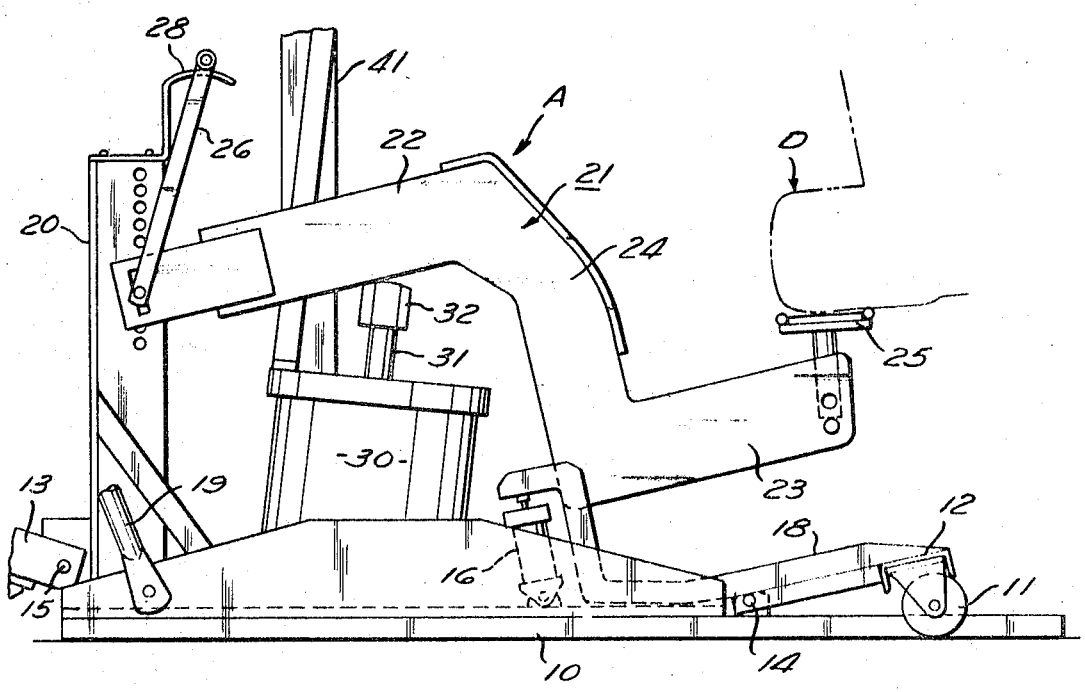
FIGURE 3 is a fragmentary side elevational view drawn to the same scale as FIGURE 1, showing the casters retracted and the sprung end of an automobile being lifted by the testing unit.

The operating arm 21 is moved by means of a pneumatic operating cylinder 30 mounted on the base frame 10 beneath the upper end 22 of the arm 21. The piston rod 31 extending upwardly from the top of the cylinder 30 has a drive head 32 at its upper end with a spherical dome formed therein that engages the bottom of the upper end 22 of the arm 21. Accordingly, extension of the piston rod 31 forces the drive head 32 against the upper end 22 to raise the arm 21 as shown in FIGURE 3. The raising movement is effective to lift the bumper D at the sprung end of the automobile C again as shown in FIGURE 3. The amount of movement can be accurately controlled by the operator using the position indicator arm 26.

Air to the bottom end of the operating cylinder 30 to cause extension of the piston rod 31 is supplied through a pressure line 33 communicating with a four-way air valve 34 of conventional design. The valve positions are controlled by means of an operating handle 35 and the speed of the piston rod extension is controlled by a pressure regulator 36.

A positive retraction of the piston in the cylinder 30 is accomplished by means of an air line 37 also communicating with the four-way valve 34. A positive retraction is essential in order that the drive head 32 be moved downward to permit the operating arm 21 to drop with a greater acceleration than that of the sprung end of the vehicle after lifting pressure is released. This desired arm release acceleration is achieved so long as the arm 21 is permitted to drop freely, since the downward acceleration or jounce of the sprung end of the automobile C is inhibited by its suspension system which tends to oppose the gravitational force. In the preferred form, the drive head 32 is positively connected to the arm 21 so that the arm is pulled downward with the head 32 during piston retraction.

During the retraction movement, air at the lower end of the cylinder 30 is exhausted through a one-way air valve 38 located in the air pressure line 33. Conversely during the extension movement of the piston in the cylinder 30 the air from the upper end of the cylinder is exhausted through the four-way air valve 34.

It will be seen that the initial position of the bumper shoe 25 must be spaced sufficiently from the bottom of the bumper D so that the jounce motion of the sprung end of the automobile below its neutral position will not place the bumper D in engagement with the shoe 25 when the shoe is at the lower limit of its movement shown in FIGURE 1. In order to assure this condition, the position of the shoe 25 relative to the bumper D may be adjusted by moving the pivot connection of the arm 21 to one of several holes in the vertical post 20.

The operation of the air cylinders 16 and 17 is controlled by an air valve 40, both air valves 36 and 40 being mounted on a vertical post 41 welded to the base frame 10. Air for the system is supplied through a main pressure line 42 connected to a conventional source of pneumatic pressure of the type normally available at service stations and garages to service a variety of air operated equipment. The main pressure line 42 connects with a pressure regulator 43 also mounted on the vertical post 42.

Mounted at the top of the post 42 is the meter B which comprises an accelerometer 50 that is placed on the sprung end of the automobile C such as by permanent magnets, and an indicator panel 51 which serves to analyze the magnitude of accelerations sensed by the accelerometer 50 as well as the number of oscillations above a minimum amplitude. The accelerometer 50 may be for example of the piezoelectric type. Through means of an analyzer circuit which measures the magnitude of the accelerations during the oscillations of the sprung end of the automobile C after release of the lifting arm 21, a meter reading is provided which indicates the dampening effect of the shock absorbers at the end of the automobile which has been under test.

In a satisfactory condition the oscillations will be reduced to a negligible amplitude after one jounce-rebound-jounce cycle. Accordingly, if oscillations after the jounce-rebound-jounce cycle still exceed a negligible amplitude, the meter B will provide an "Unsatisfactory" reading. However, where the oscillations are dampened to a negligible amount after a jounce-rebound-jounce cycle or even before, the meter B will indicate a "Satisfactory" dampening ability. An "Unsatisfactory" reading would indicate that one or more shock absorbers were defective however in almost all cases the shock absorbers would have reached a substantially identical wear condition such that both would have to be replaced.

Operation

In the operation of the unit A such as for example to test the dampening effect of the shock absorbers at the front end of the automobile C, the operator using the handle 19 pushes the front end of the unit A, with the casters 11 extended as shown in FIGURE 1, into position at the front end of the automobile C with the shoe 25 located immediately beneath the center of the bumper D. The operator then operates the valve 40 to cause the caster cylinders 16 and 17 to raise their respective caster frames 12 and 13 so that the base frame 10 drops to the floor (FIGURE 3). The operator then checks to see that sufficient clearance (e.g., about 3 inches) is provided between the shoe 25 and the bottom of the bumper D. If this is not the case the height of the bumper 25 may be changed using the adjustment holes in the lower end 23 of the arm 21.

The operator then places the accelerometer 50 at a desired location generally at the forward end of the hood of the automobile C and assures that it is properly connected to the indicator panel 51. The parking brakes on the vehicle should be set before testing for obvious reasons.

With the unit A thus readied for testing, the operator moves the operating handle 35 to move the four-way air valve 36 so as to raise the lower end 23 of the arm 21 until the shoe 25 comes into engagement with the bumper D. The operator stops movement of the arm 21 at this time and proceeds to adjust the position indicator arm 26 to the zero (0) position on the position scale 27. Then the operator moves the handle 35 to raise the sprung end of the automobile C until the position indicator reaches a desired point on the scale 27. For most purposes a vertical distance of 3" is suitable. A drop from this position simulates a moderately severe jolt which the automobile might be expected to experience during normal operation. As soon as the lifting is completed as indicated by the position indicator arm 26, the handle 35 is moved to shut off the supply of air to the bottom of the cylinder 30 and at the same time the handle 35 is moved to the release position wherein air pressure is supplied through the line 37 to the top of the cylinder 30 to drive the piston downward at an acceleration greater than that produced by gravitational forces acting on the lever 21. Air from the lower end of the cylinder is exhausted through the one-way exhaust valve 38.

The sudden release of the arm 21 permits the shoe 25 to drop away from the bumper so that the front end of the automobile C will drop or jounce on the suspension system to a lower limit of vertical movement, rebound upward and oscillate until the oscillations are dampened out by the shock absorbers. During this time the operator observes the meter B and obtains a reading which reflects the dampening ability of the shock absorbers being tested.

While the invention has been shown and described with reference to a specific embodiment thereof, this is intended for the purpose of illustration rather than limitation and variations and modifications will become apparent to those skilled in the art within the intended spirit and scope of the invention as herein specifically illustrated and described. Therefore the patent is not to be limited in scope and effect to the preferred form shown herein nor in any other way that is inconsistent with the extent to which progress in the art has been advanced by the invention.

I claim:

1. Apparatus for testing shock absorbers in situ on an automobile, comprising a base, an operating arm, pivotally supported on said base, one end of said arm being operable to engage and lift a sprung end of the automobile on which shock absorbers to be tested are mounted, a fluid cylinder supported on said base, a double acting piston in said cylinder operatively associated with said arm and movable in response to fluid pressure between an initial position and a lifting position, fluid control means for said cylinder for driving said piston to its lifting position to raise said end of said arm and for positively driving said piston in its reverse direction back to its initial position to permit said arm to drop at an acceleration greater than that of said sprung end during the resulting jounce of said sprung end from its lifted position, and means for measuring and indicating the magnitude and number of vertical oscillations induced by lifting and releasing of said sprung end to determine the dampening ability of said shock absorbers.

2. Apparatus as defined in claim 1 including a position indicator mounted on said arm for measuring the vertical distance that the sprung end of automobile is lifted by said arm.

3. Apparatus as defined in claim 1 wherein said arm has a dog-leg shape and comprises a generally horizontal upper end having a pivotal connection, a generally horizontal lower end for lifting a vehicle end and a central connecting portion generally perpendicular to said upper and lower ends, said cylinder being located beneath said upper end and said piston being adapted to act upon said upper end between said pivotal connection and said central portion.

References Cited

UNITED STATES PATENTS

| 2,031,700 | 2/1936 | Fiedler | 254—93 |
| 2,133,843 | 10/1938 | Berry | 73—11 |
| 3,164,003 | 1/1965 | MacMillan | 73—11 |

RICHARD C. QUEISSER, Primary Examiner

J. K. LUNSFORD, Assistant Examiner